US009355613B2

(12) United States Patent
Ju et al.

(10) Patent No.: US 9,355,613 B2
(45) Date of Patent: May 31, 2016

(54) DATA PROCESSING APPARATUS FOR TRANSMITTING/RECEIVING COMPRESSION-RELATED INDICATION INFORMATION VIA DISPLAY INTERFACE AND RELATED DATA PROCESSING METHOD

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/936,231

(22) Filed: Jul. 8, 2013

(65) Prior Publication Data

US 2014/0098119 A1 Apr. 10, 2014

Related U.S. Application Data

(60) Provisional application No. 61/711,319, filed on Oct. 9, 2012, provisional application No. 61/712,949, filed on Oct. 12, 2012.

(51) Int. Cl.
*G06T 1/20* (2006.01)
*G06T 9/00* (2006.01)
(Continued)

(52) U.S. Cl.
CPC *G09G 5/006* (2013.01); *G06T 1/20* (2013.01); *G06T 9/00* (2013.01); *G09G 5/005* (2013.01);
(Continued)

(58) Field of Classification Search
CPC .................................. G06T 1/20; G06T 9/00
USPC .................................................. 345/501, 520
See application file for complete search history.

(56) References Cited

U.S. PATENT DOCUMENTS 4,424,565 A * 1/1984 Larson .......................... 709/245
5,553,160 A 9/1996 Dawson
(Continued)

FOREIGN PATENT DOCUMENTS

CN 1610408 A 4/2005
CN 1838772 A 9/2006
(Continued)

OTHER PUBLICATIONS

"International Search Report" mailed on Dec. 19, 2013 for International application No. PCT/CN2013/083118, International filed: Sep. 9, 2013.

(Continued)

*Primary Examiner* — Joni Richer
(74) *Attorney, Agent, or Firm* — Winston Hsu; Scott Margo

(57) ABSTRACT

A data processing apparatus has a compressor and an output interface. The compressor generates a compressed display data by compressing a display data according to a compression algorithm. The output interface records indication information in an output bitstream, and outputs the output bitstream via a display interface, wherein the output bitstream is derived from the compressed display data, and the indication information is set in response to the compression algorithm employed by the compressor. Another data processing apparatus has a de-compressor and an input interface. The de-compressor de-compresses a compressed display data derived from an input bitstream. The input interface receives the input bitstream via a display interface, parses indication information included in the input bitstream, and configures the de-compressor to employ a de-compression algorithm as indicated by the indication information.

18 Claims, 7 Drawing Sheets

(51) Int. Cl.
  H04N 19/172 (2014.01)
  G09G 5/00 (2006.01)
  H04N 19/12 (2014.01)
  H04N 19/136 (2014.01)
  H04N 19/156 (2014.01)
  H04N 19/164 (2014.01)

(52) U.S. Cl.
  CPC ............. *H04N 19/12* (2014.11); *H04N 19/136* (2014.11); *H04N 19/156* (2014.11); *H04N 19/164* (2014.11); *H04N 19/172* (2014.11); *G09G 2330/021* (2013.01); *G09G 2340/02* (2013.01); *G09G 2350/00* (2013.01); *G09G 2370/10* (2013.01)

(56) References Cited

U.S. PATENT DOCUMENTS

| | | | |
|---|---|---|---|
| 5,760,760 A | 6/1998 | Helms | |
| 5,943,508 A * | 8/1999 | Penney et al. | 710/51 |
| 6,031,929 A | 2/2000 | Maitz | |
| 6,704,022 B1 * | 3/2004 | Aleksic | 345/555 |
| 6,914,637 B1 | 7/2005 | Wolf | |
| 7,822,278 B1 | 10/2010 | Hobbs | |
| 7,903,119 B2 * | 3/2011 | Hochmuth et al. | 345/522 |
| 8,112,513 B2 | 2/2012 | Margulis | |
| 8,145,813 B2 * | 3/2012 | Ho et al. | 710/62 |
| 8,179,971 B1 | 5/2012 | Gough | |
| 8,363,969 B1 | 1/2013 | Wang | |
| 8,599,316 B2 | 12/2013 | Deever | |
| 2002/0030675 A1 | 3/2002 | Kawai | |
| 2002/0057265 A1 | 5/2002 | Tamura | |
| 2002/0105905 A1 | 8/2002 | Boyle | |
| 2003/0234799 A1 | 12/2003 | Lee | |
| 2004/0103216 A1 | 5/2004 | Lane | |
| 2005/0135682 A1 | 6/2005 | Abrams | |
| 2005/0276496 A1 | 12/2005 | Molgaard | |
| 2006/0037051 A1 | 2/2006 | McDowell | |
| 2006/0117371 A1 | 6/2006 | Margulis | |
| 2006/0159358 A1 | 7/2006 | Yi | |
| 2006/0215755 A1 | 9/2006 | Ju | |
| 2007/0081587 A1 | 4/2007 | Raveendran | |
| 2007/0255926 A1 | 11/2007 | Chuang | |
| 2009/0129478 A1 | 5/2009 | Meroth | |
| 2009/0322713 A1 * | 12/2009 | Furihata et al. | 345/204 |
| 2010/0073574 A1 | 3/2010 | Nakajima | |
| 2010/0158104 A1 | 6/2010 | Lin | |
| 2010/0182402 A1 | 7/2010 | Nakajima | |
| 2010/0328425 A1 | 12/2010 | Nagaraj | |
| 2011/0075729 A1 | 3/2011 | Dane | |
| 2011/0249723 A1 | 10/2011 | Wasily | |
| 2012/0027317 A1 | 2/2012 | Choi | |
| 2012/0068952 A1 | 3/2012 | Slaby | |
| 2012/0072044 A1 | 3/2012 | Slaby | |
| 2012/0072157 A1 | 3/2012 | Alameh | |
| 2012/0163181 A1 | 6/2012 | Xue | |
| 2012/0207155 A1 * | 8/2012 | Nelogal et al. | 370/389 |
| 2013/0088373 A1 | 4/2013 | Takano | |
| 2013/0179659 A1 | 7/2013 | Seo | |
| 2013/0293121 A1 | 11/2013 | Viacheslav | |
| 2013/0322517 A1 | 12/2013 | Zurpal | |

FOREIGN PATENT DOCUMENTS

| | | |
|---|---|---|
| CN | 101035086 A | 9/2007 |
| CN | 101237301 A | 8/2008 |
| CN | 101355364 A | 1/2009 |
| CN | 101378384 A | 3/2009 |
| CN | 101553795 A | 10/2009 |
| CN | 101669361 A | 3/2010 |
| CN | 101426132 B | 7/2010 |
| CN | 201758429 U | 3/2011 |
| CN | 101340575 B | 4/2012 |
| CN | 102939630 A | 2/2013 |

OTHER PUBLICATIONS

"International Search Report" mailed on Dec. 19, 2013 for International application No. PCT/CN2013/083653, International filed: Sep. 17, 2013.

"International Search Report" mailed on Dec. 5, 2013 for International application No. PCT/CN2013/083061, International filed: Sep. 6, 2013.

"International Search Report" mailed on Jan. 2, 2014 for International application No. PCT/CN2013/084496, International filed: Sep. 27, 2013.

"International Search Report" mailed on Jan. 2, 2014 for International application No. PCT/CN2013/084489, International filed: Sep. 27, 2013.

"International Search Report" mailed on Dec. 26, 2013 for International application No. PCT/CN2013/083739, International filing date: Sep. 18, 2013.

* cited by examiner

DATA PROCESSING APPARATUS FOR TRANSMITTING/RECEIVING COMPRESSION-RELATED INDICATION INFORMATION VIA DISPLAY INTERFACE AND RELATED DATA PROCESSING METHOD

CROSS REFERENCE TO RELATED APPLICATIONS

This application claims the benefit of U.S. provisional application No. 61/711,319, filed on Oct. 9, 2012 and incorporated herein by reference.

BACKGROUND

The disclosed embodiments of the present invention relate to transmitting and receiving display data over a display interface, and more particularly, to a data processing apparatus for transmitting/receiving compression-related indication information via a display interface and related data processing method.

A display interface is disposed between a first chip and a second chip to transmit display data from the first chip to the second chip for further processing. For example, the first chip may be a host application processor, and the second chip may be a driver integrated circuit (IC). The display data may include image data, video data, graphic data, and/or OSD (on-screen display) data. Besides, the display data may be single view data for two-dimensional (2D) display or multiple view data for three-dimensional (3D) display. When a display panel supports a higher display resolution, 2D/3D display with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface. Thus, there is a need for an innovative design which can effectively reduce the power consumption of the display interface.

SUMMARY

In accordance with exemplary embodiments of the present invention, a data processing apparatus for transmitting/receiving compression-related indication information via a display interface and related data processing method are proposed.

According to a first aspect of the present invention, an exemplary data processing apparatus is disclosed. The exemplary data processing apparatus has a compressor and an output interface. The compressor is arranged for generating a compressed display data by compressing a display data according to a compression algorithm. The output interface is arranged for recording indication information in an output bitstream and outputting the output bitstream via a display interface, wherein the output bitstream is derived from the compressed display data, and the indication information is set in response to the compression algorithm employed by the compressor.

According to a second aspect of the present invention, an exemplary data processing apparatus is disclosed. The exemplary data processing apparatus has a de-compressor and an input interface. The de-compressor is arranged for de-compressing a compressed display data derived from an input bitstream. The input interface is arranged for receiving the input bitstream via a display interface, parsing indication information included in the input bitstream, and configuring the de-compressor to employ a de-compression algorithm as indicated by the indication information.

According to a third aspect of the present invention, an exemplary data processing method is disclosed. The exemplary data processing method includes at least the following steps: generating a compressed display data by compressing a display data according to a compression algorithm; and recording indication information in an output bitstream and outputting the output bitstream via a display interface, wherein the output bitstream is derived from the compressed display data, and the indication information is set in response to the compression algorithm.

According to a fourth aspect of the present invention, an exemplary data processing method is disclosed. The exemplary data processing method includes at least the following steps: de-compressing a compressed display data derived from an input bitstream; and receiving the input bitstream via a display interface, parsing indication information included in the input bitstream, and configuring the de-compressing step to employ a de-compression algorithm as indicated by the indication information.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a display data and then transmitting a compressed display data over a display interface. As the data size/data rate of the compressed display data is smaller than that of the original un-compressed display data, the power consumption of the display interface is reduced correspondingly. Besides, the de-compression algorithm employed by a receiving end which receives and de-compresses a compressed display data is required to be compliant with the compression algorithm employed by a transmitting end which generates and transmits the compressed display data; otherwise, the receiving end fails to correctly de-compress the compressed display data. Therefore, the present invention further proposes transmitting/receiving the compression-related indication information via the display interface, such that the de-compression algorithm of the receiving end is properly configured based on the compression-related indication information. Further details will be described as below.

Figure 1:
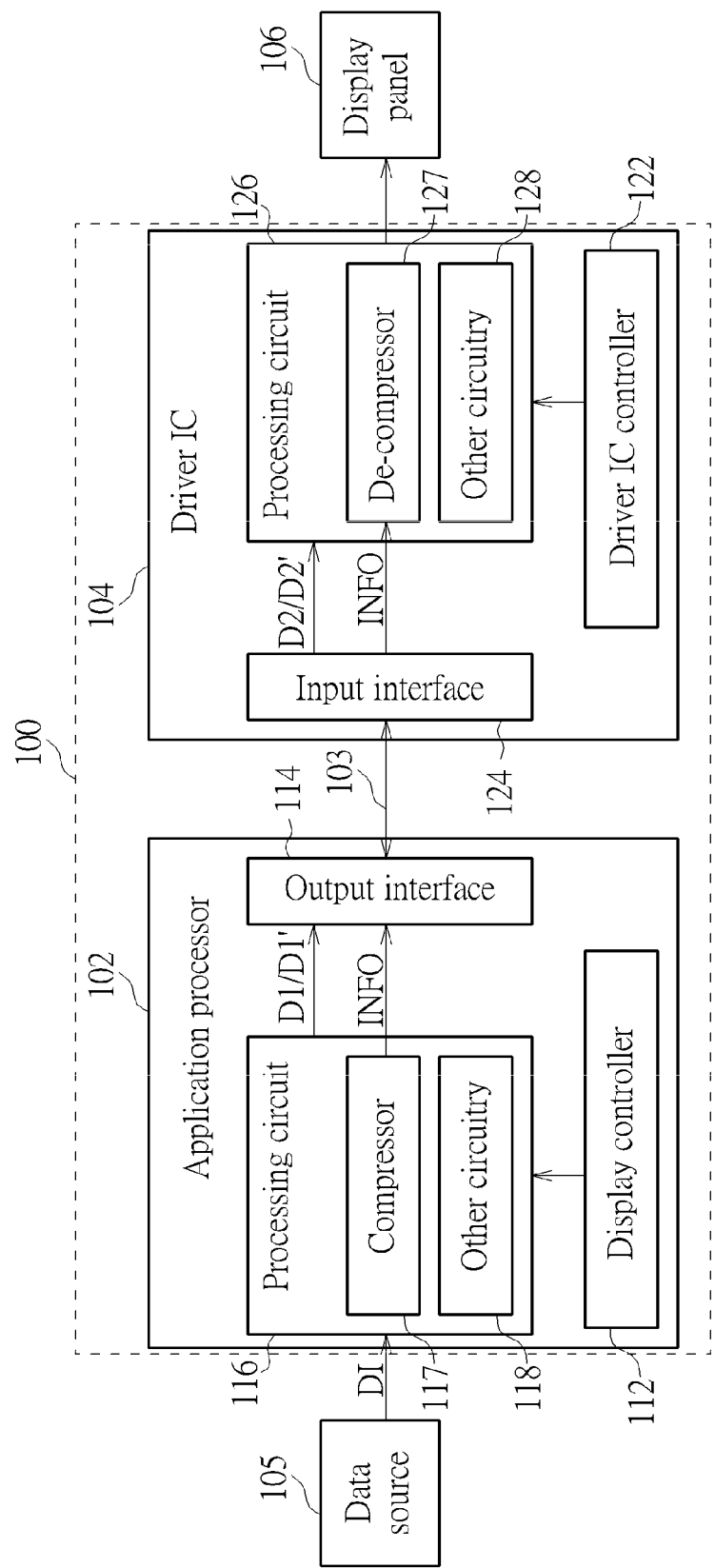
FIG. 1 is a block diagram illustrating a data processing system according to an embodiment of the present invention.

FIG. 1 is a block diagram illustrating a data processing system according to an embodiment of the present invention. The data processing system 100 includes a plurality of data processing apparatuses such as an application processor 102 and a driver integrated circuit (IC) 104. The application processor 102 and the driver IC 104 may be different chips, and the application processor 102 communicates with the driver IC 104 via a display interface 103. In this embodiment, the display interface 103 may be a display serial interface (DSI) standardized by a Mobile Industry Processor Interface (MIPI) or an embedded display port (eDP) standardized by a Video Electronics Standards Association (VESA).

The application processor 102 is coupled to the display interface 103, and supports un-compressed data transmission and compressed data transmission. When the application processor 102 is used to transmit un-compressed data to the driver IC 104, the application processor 102 generates the un-compressed display data D1 according to an input display data DI provided by an external data source 105, and transmits the un-compressed display data D1 over the display interface 103. When the application processor 102 is used to transmit compressed data to the driver IC 104, the application processor 102 generates a compressed display data D1' according to the input display data DI provided by the external data source 105, and transmits the compressed display data D1' over the display interface 103. By way of example, but not limitation, the data source 105 may be a camera sensor, a memory card or a wireless receiver, and the input display data DI may include image data, video data, graphic data, and/or OSD data. Further, the input display data DI may be single view data for 2D display or multiple view data for 3D display.

As shown in FIG. 1, the application processor 102 includes a display controller 112, an output interface 114 and a processing circuit 116. The processing circuit 116 includes circuit elements required for processing the input display data DI to generate the un-compressed data D1 or the compressed data D1'. For example, the processing circuit 116 has a compressor 117 and other circuitry 118, where the other circuitry 118 may have a display processor, a multiplexer, additional image/video processing element(s), etc. The display processor may perform image processing operations, including scaling, rotating, etc. For example, the display processor processes a source display data derived from the input display data DI to generate the un-compressed display data D1, where the input display data DI may be bypassed or processed by the additional image/video processing element(s) located before the display processor to generate the source display data. The compressor 117 performs data compression. Hence, the compressor 117 generates the compressed display data D1' by compressing the un-compressed display data D1 according to a compression algorithm. The multiplexer receives the un-compressed display data D1 and the compressed display data D1', and selectively outputs the un-compressed display data D1 or the compressed display data D1' according to the operation mode of the application processor 102. For example, the display controller 112 controls the operation of the application processor 102. Hence, when the application processor 102 is operated under a compression mode, the multiplexer is controlled by the display controller 112 to output the compressed display data D1'; and when the application processor 102 is operated under a non-compression mode, the multiplexer is controlled by the display controller 112 to output the un-compressed display data D1. As the present invention focuses on the handshaking mechanism between the application processor 102 and the driver IC 104, further description of the other circuit 118 is omitted here for brevity.

The output interface 114 is arranged for packing/packetizing the un-compressed display data D1/compressed display data D1' into an output bitstream according to the transmission protocol of the display interface 103, and transmits the output bitstream to the driver IC 104 via the display interface 103. When the compression mode of the application processor 102 is enabled, the compressor 117 further sets indication information INFO in response to the compression algorithm employed. Besides, the output interface 114 further records the indication information INFO in the output bitstream. In this way, when the output bitstream is transmitted from the application processor 102 to the driver IC 104, the compression-related indication information (e.g., the indication information INFO) is also transmitted via the display interface 103.

Regarding the driver IC 104, it communicates with the application processor 102 via the display interface 103. In this embodiment, the driver IC 104 is coupled to the display interface 103, and supports un-compressed data reception and compressed data reception. When the application processor 102 transmits the un-compressed data D1 to the driver IC 104, the driver IC 104 is operated under a non-decompression mode to receive an un-compressed data D2 from the display interface 103 and drive a display panel 106 according to the un-compressed display data D2. By way of example, the display panel 106 may be implemented using any 2D/3D display device (e.g. a retina display), and the pixel arrangement may be a rectangle layout, a triangle layout or a pentile layout. When the application processor 102 transmits the compressed data D1' to the driver IC 104, the driver IC 104 is operated under a de-compression mode to receive a compressed display data D2' from the display interface 103 and drive the display panel 106 according to a de-compressed display data derived from de-compressing the compressed display data D2'. If there is no error introduced during the data transmission, the un-compressed data D1 transmitted under the non-compression mode should be identical to the un-compressed data D2 received under the non-decompression mode, and the compressed data D1' transmitted under the compression mode should be identical to the compressed data D2' received under the de-compression mode.

As shown in FIG. 1, the driver IC 104 includes a driver IC controller 122, an input interface 124 and a processing circuit 126. The processing circuit 126 may include circuit elements required for driving the display panel 106 according to a video mode or an image/command mode. For example, the processing circuit 126 has a de-compressor 127 and other circuitry 128, and the other circuitry 128 may have a display buffer, multiplexers, etc. The de-compressor 127 is used for performing data de-compression. Hence, the de-compressor 127 generates the de-compressed display data by de-compressing the compressed display data D2' according to a de-compression algorithm, where the compressed display data D2' is derived from an input bitstream received from the display interface 103. The display buffer is arranged for storing a display data to provide a buffered display data under the image/command mode, wherein the display data stored into the display buffer may be an un-compressed display data, a compressed display data or a de-compressed display data, depending upon actual design consideration/requirement. The multiplexers control interconnections of the de-compressor 127, the display buffer and the display panel 106. As the present invention focuses on the handshaking mechanism between the application processor 102 and the driver IC 104, further description of the other circuitry 128 is omitted here for brevity.

The input interface 124 is arranged for receiving the input bitstream from the display interface 103, and un-packing/un-packetizing the input bitstream into un-compressed display data D2/compressed display data D2' according to the transmission protocol of the display interface 103. When the de-compression mode of the driver IC 104 is enabled, the input interface 124 is further arranged for parsing the indication information INFO included in the input bitstream, and configuring the de-compressor 127 to employ a de-compression algorithm as indicated by the indication information INFO. In addition to the compressed data transmission between the application processor 102 and the driver IC 104, information handshaking is realized through the display interface 103. Therefore, with the help of the indication information INFO supplied from the application processor 102, the de-compressor 127 of the driver IC 104 is properly configured to employ an adequate de-compression algorithm needed for de-compressing the compressed data D2' correctly.

Figure 2:
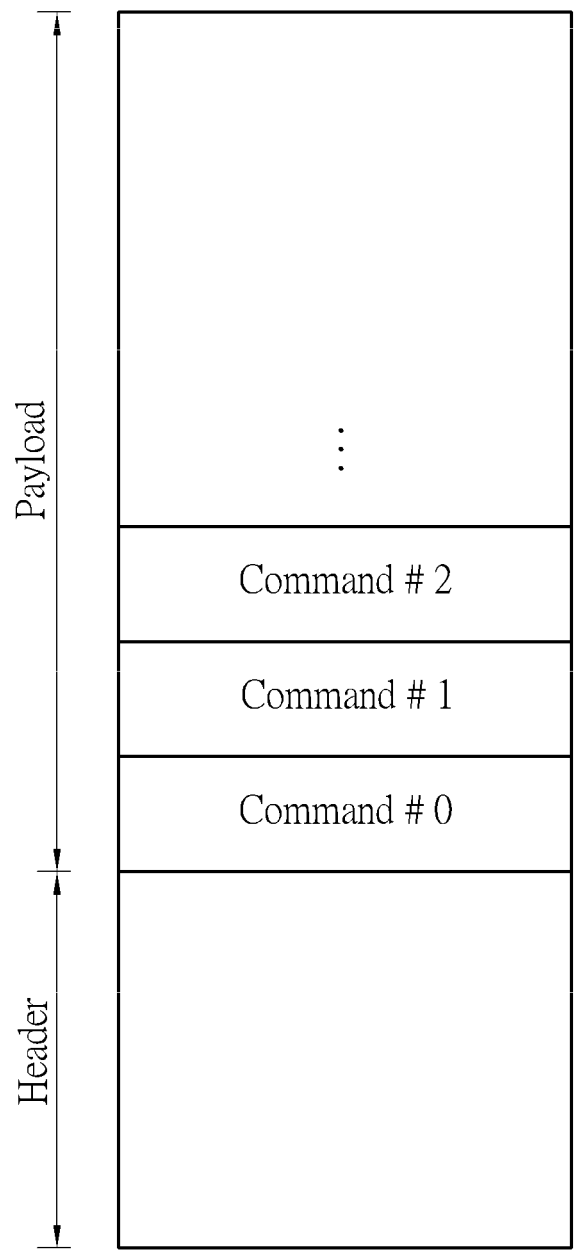
FIG. 2 is a diagram illustrating a data structure of the output bitstream generated from the application processor to the driver IC according to an embodiment of the present invention.

In one exemplary design, the output interface 114 records the indication information INFO by setting a command set in a payload portion of the output bitstream transmitted over the display interface 103, and the input interface 124 obtains the indication information INFO by parsing a command set in a payload portion of the input bitstream received from the display interface 103. Please refer to FIG. 2, which is a diagram illustrating a data structure of the output bitstream generated from the application processor 102 to the driver IC 104 according to an embodiment of the present invention. The information handshaking between the application processor 102 and the driver IC 104 may be realized by defining a set of commands in the transmitted payload. For example, these commands can be specified in either a user command set or a manufactured command set based on MIPI display command set (DCS) specification, where each command in a command set is an 8-bit code, and the command set can be used to communicate between the application processor 102 and the driver IC 104 about the compression capability and compression/de-compression algorithms they support. Please refer to FIG. 3, which is a diagram illustrating an example of information handshaking between the application processor 102 and the driver IC 104. In this example, the compressor 117 supports four compression algorithms, and the de-compressor 127 supports four de-compression algorithms compliant with the compression algorithms, respectively. The different compression algorithms may handle different compression ratios, different compression unit sizes, different color formats (e.g. RGB or YCbCr), different sub-sampling formats (e.g. 4:4:4 or 4:2:2), and/or different bit depths (RGB888 or RGB565). Hence, the indication information INFO is adjusted when at least one of a compression ratio, a compression unit size, a color format, a sub-sampling format, and a bit depth of a compression algorithm employed is changed. The application processor 102 may check a de-compression capability of the driver IC 104 by sending a request to the driver IC 104 through the display interface 103, and the driver IC 104 may inform the application processor 102 of its de-compression capability by sending a response to the application processor 102 through the display interface 103. In this way, the application processor 102 can detect whether the driver IC 104 has the ability of performing data de-compression, and can further detect what kinds of de-compression algorithms the driver IC 104 supports if the driver IC 104 is equipped with the de-compression capability. In this example, the compressor 117 at the application processor 102 is configured to use the compression algorithm #4, and the indication information INFO is set correspondingly. The indication information INFO is carried by the command set transmitted from the application processor 102 to the driver IC 104 via the display interface 103. Hence, the driver IC 104 receives the indication information INFO through the display interface 103, and configures the de-compressor 127 to employ the de-compression algorithm #4 as indicated by the indication information INFO.

Figure 4:
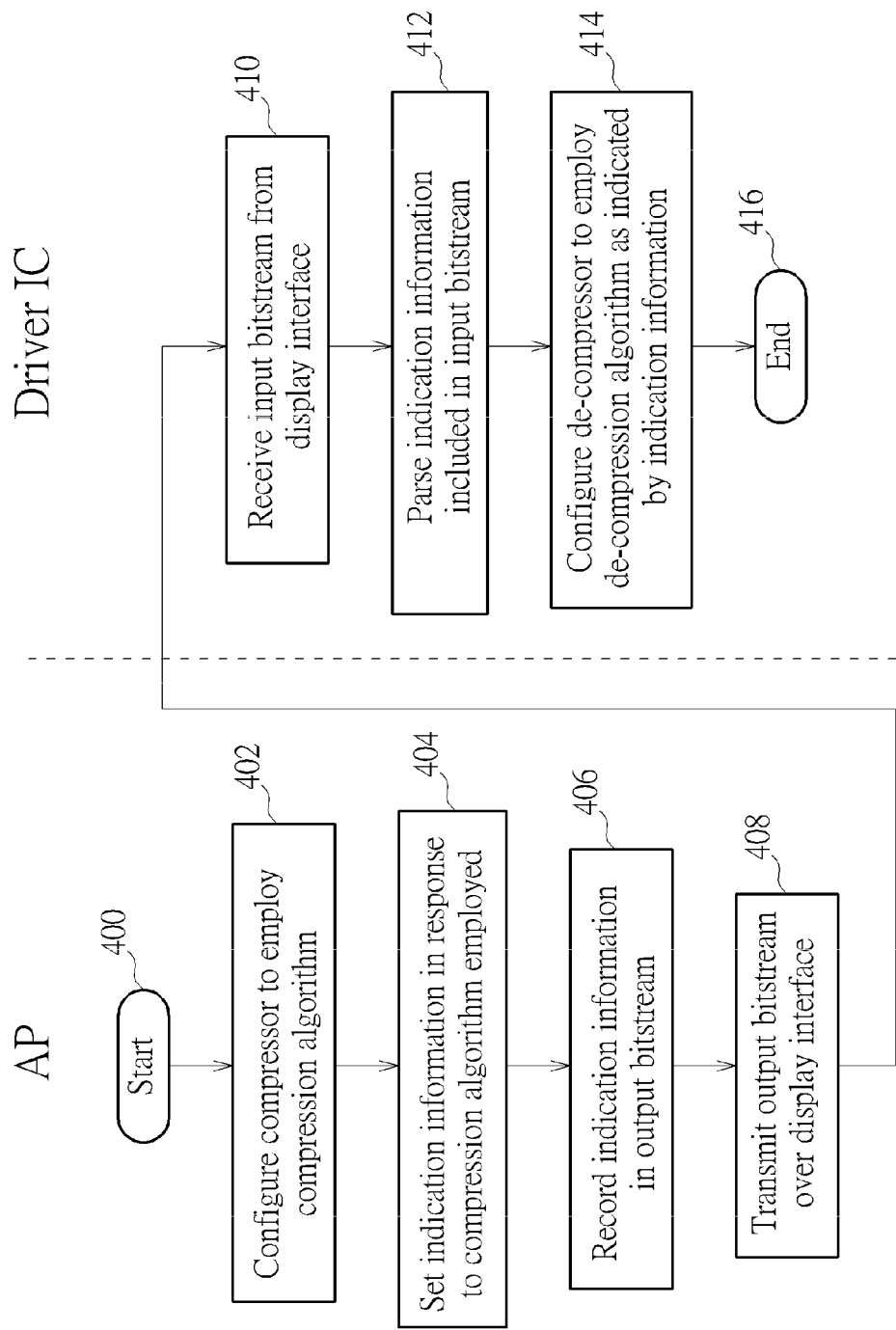
FIG. 4 is a flowchart illustrating a control and data flow of the data processing system shown in FIG. 1 when interface compression is enabled.

FIG. 4 is a flowchart illustrating a control and data flow of the data processing system 100 shown in FIG. 1 when interface compression is enabled. Provided that the result is substantially the same, the steps are not required to be executed in the exact order shown in FIG. 4 The exemplary control and data flow may be briefly summarized by following steps.

Step 400: Start.

Step 402: Configure the compressor 117 to employ a compression algorithm.

Step 404: Set the indication information INFO in response to the compression algorithm employed by the compressor 117.

Step 406: Record the indication information INFO in an output bitstream. For example, the indication information INFO is recorded by setting a command set in a payload portion of the output bitstream.

Step 408: Transmit the output bitstream over the display interface 103.

Step 410: Receive an input bitstream from the display interface 103.

Step 412: Parse the indication information INFO included in the input bitstream. For example, the indication information INFO is obtained by parsing a command set in a payload portion of the input bitstream.

Step 414: Configure the de-compressor 127 to employ a de-compression algorithm as indicated by the indication information INFO.

Step 416: End.

It should be noted that steps 402-408 are performed by the application processor (AP) 102, and steps 410-414 are performed by the driver IC 104. As a person skilled in the art can readily understand details of each step shown in FIG. 4 after reading above paragraphs, further description is omitted here for brevity.

Figure 5:
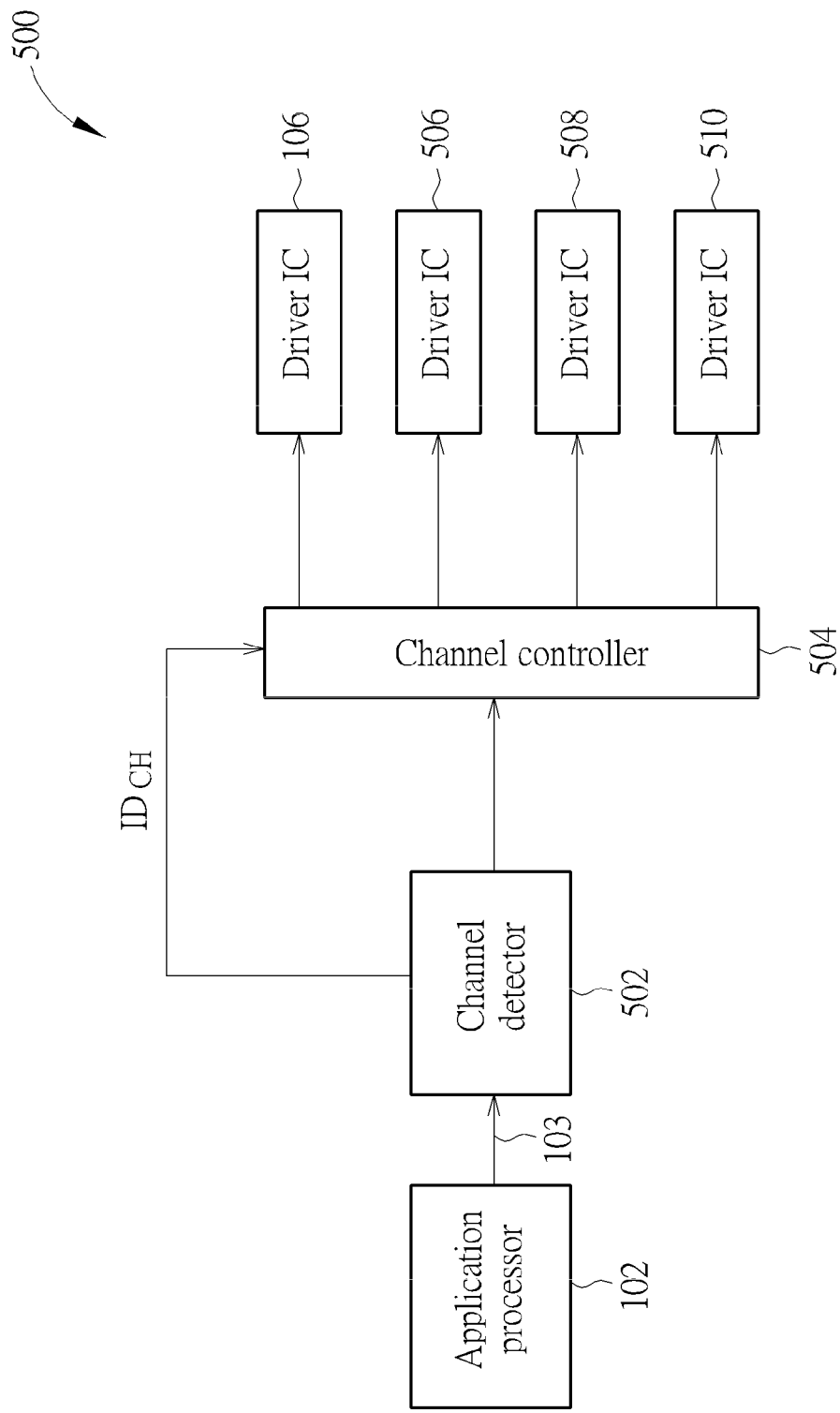
FIG. 5 is a block diagram illustrating a data processing system according to another embodiment of the present invention.

In the embodiment shown in FIG. 1, the data processing system 100 has an application processor connected to only one driver IC. However, the same handshaking mechanism may be applied to a data processing system equipped with virtual channel capability. Please refer to FIG. 5 in conjunction with FIG. 1. FIG. 5 is a block diagram illustrating a data processing system according to another embodiment of the present invention. The data processing system 500 includes a channel detector 502, a channel controller 504, and a plurality of data processing apparatuses such as one application processor (e.g., the aforementioned application processor 102 shown in FIG. 1) and multiple driver ICs (e.g., the aforementioned driver IC 106 shown in FIG. 1 and additional driver ICs 506, 508, 510). The driver ICs 106, 506, 508, 510 may be used for driving different regions of the display panel 106 shown in FIG. 1. Besides, each of the driver ICs 506, 508, 510 may have a hardware configuration identical to that of the driver IC 104. In other words, the driver ICs 506, 508, 510 also support the proposed handshaking mechanism of the present invention.

Figure 6:
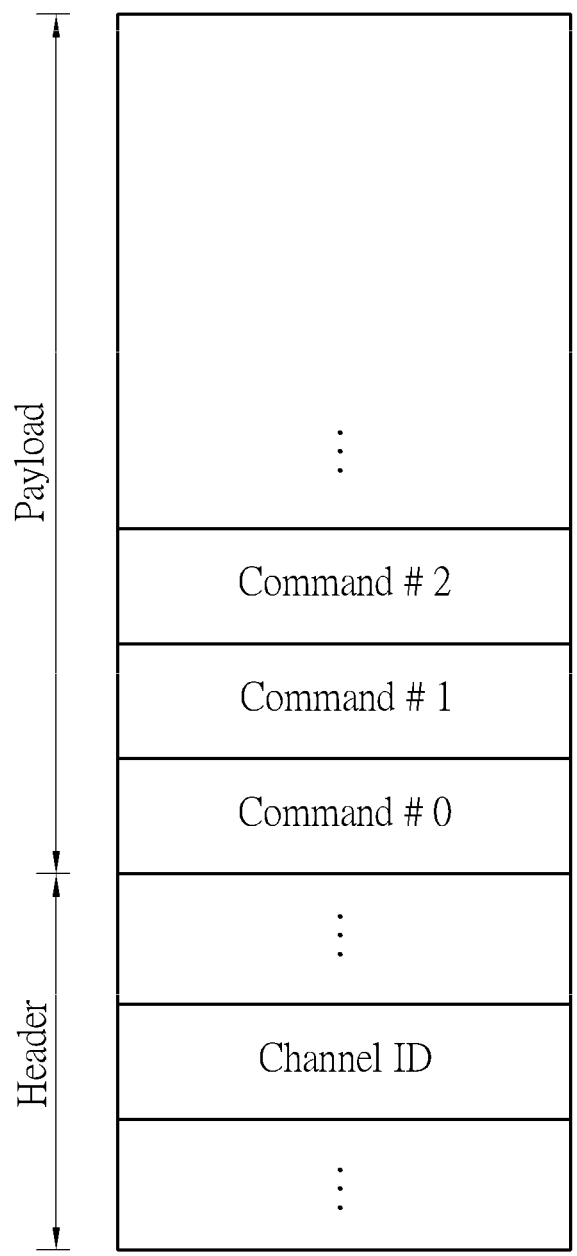
FIG. 6 is a diagram illustrating a data structure of the output bitstream generated from the application processor to the driver IC according to another embodiment of the present invention.

The channel controller 504 is arranged to direct data to individual driver ICs 106, 506, 508, 510 under the control of the channel detector 502, thus eliminating the need for multiple interfaces or complex multiplexing schemes. In this embodiment, the output interface 114 of the application processor 102 is further arranged for recording a channel identification (ID) number $ID_{CH}$ in a header portion of the output bitstream to indicate which one of the driver ICs 106, 506, 508, 510 should be connected for receiving the output bitstream. FIG. 6 is a diagram illustrating a data structure of the output bitstream generated from the application processor 102 to the driver IC 104 according to another embodiment of the present invention. As mentioned above, the information handshaking between the application processor 102 and the driver IC 104 is realized by defining a set of commands in the transmitted payload. In this embodiment, the virtual channel capability of the data processing system 500 is realized by defining the channel ID number in the transmitted header. For example, the driver IC 106 is connected for data transmission/reception when $ID_{CH}$=#1, the driver IC 506 is connected for data transmission/reception when $ID_{CH}$=#2, the driver IC 508 is connected for data transmission/reception when $ID_{CH}$=#3, and the driver IC 510 is connected for data transmission/reception when $ID_{CH}$=#4.

Figure 3:
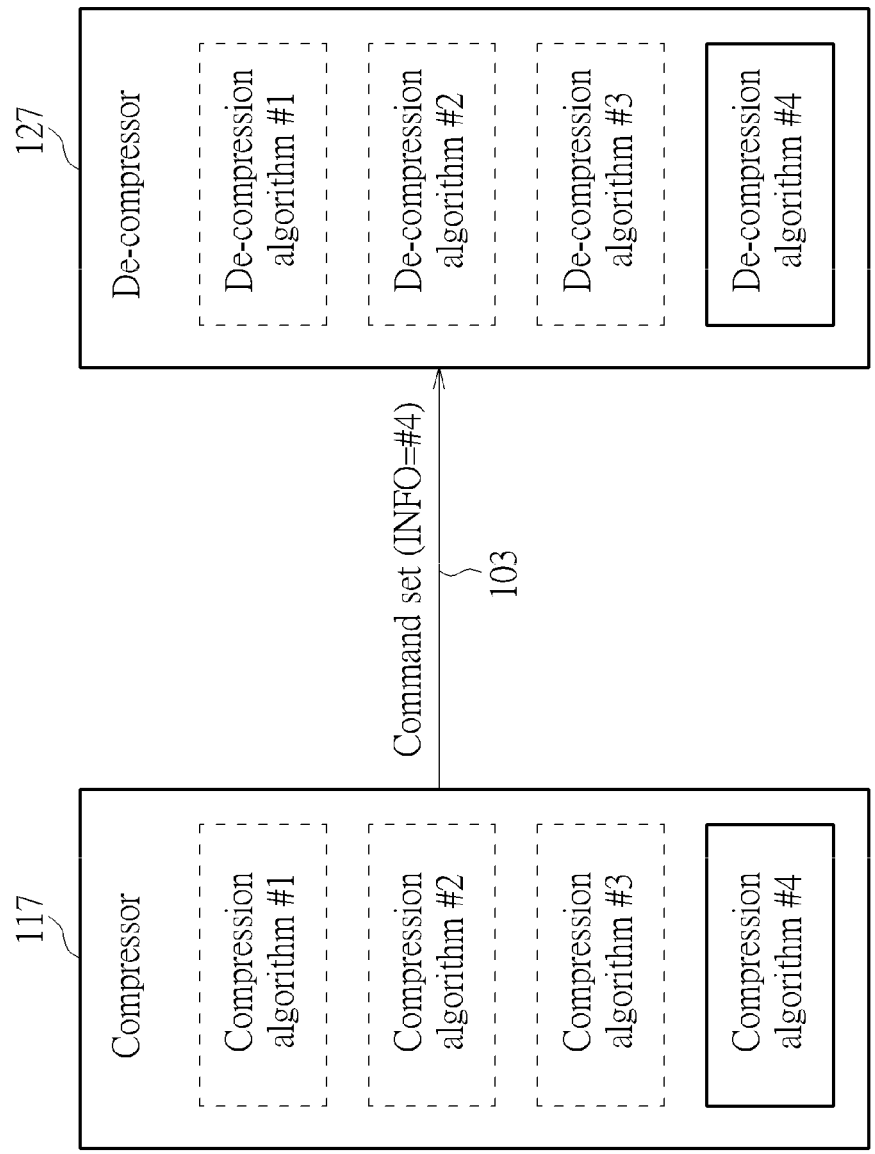
FIG. 3 is a diagram illustrating an example of information handshaking between the application processor and the driver IC.

The channel detector 502 is implemented for receiving an input bitstream from the display interface 103, and identifying the channel ID number $ID_{CH}$ from the header portion of the input bitstream. Next, the channel controller 504 dispatches the input bitstream, including the header portion and the payload portion shown in FIG. 6, to a selected driver IC with the channel ID number $ID_{CH}$. The information handshaking as illustrated in FIG. 3 is also performed between the application processor 102 and the selected driver IC (e.g., the driver IC 106, if $ID_{CH}$=#1). Further description is omitted here for brevity.

Figure 7:
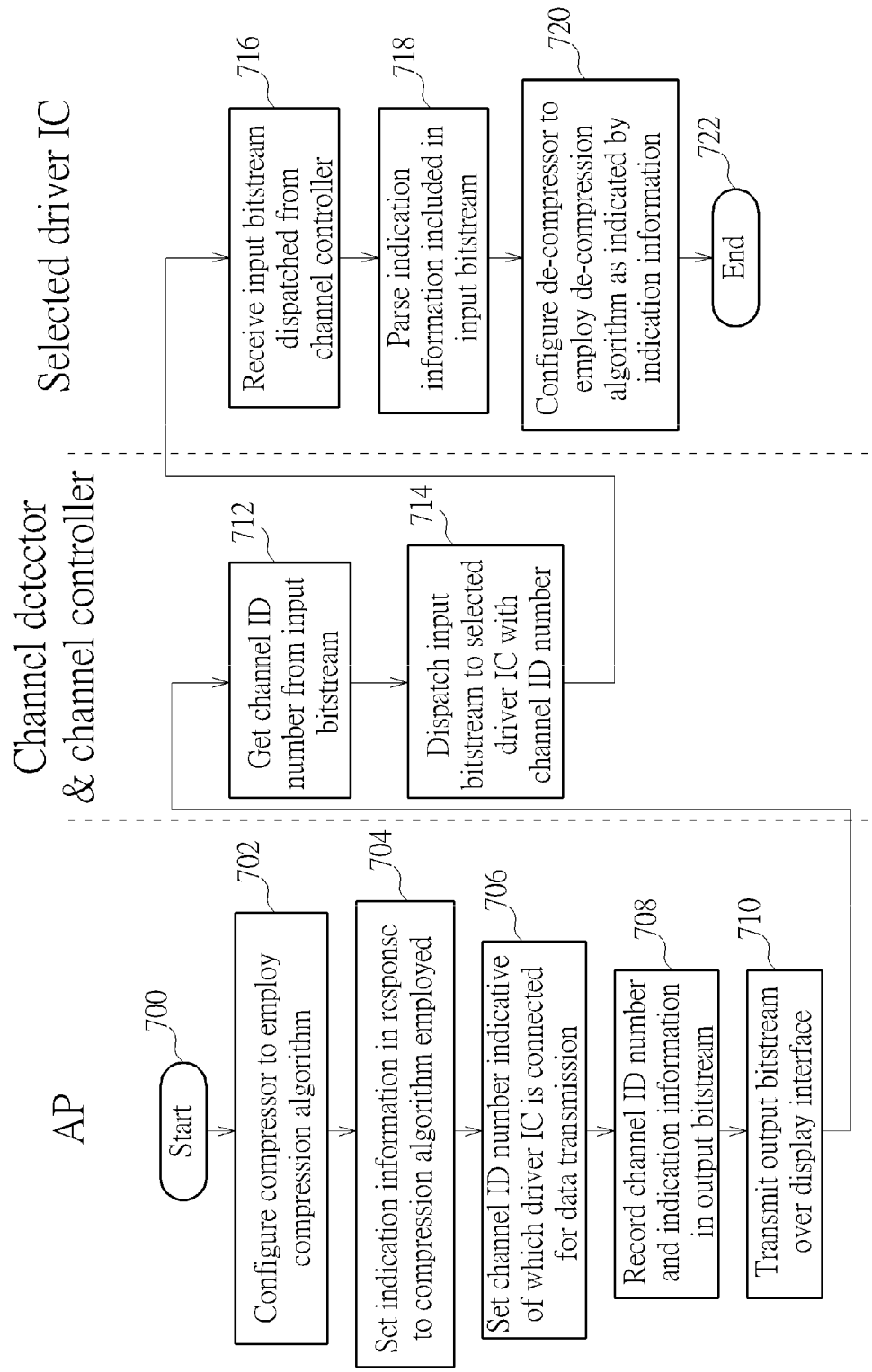
FIG. 7 is a flowchart illustrating a control and data flow of the data processing system shown in FIG. 5 when interface compression is enabled.

FIG. 7 is a flowchart illustrating a control and data flow of the data processing system 500 shown in FIG. 5 when interface compression is enabled. Provided that the result is substantially the same, the steps are not required to be executed in the exact order shown in FIG. 7. The exemplary control and data flow may be briefly summarized by following steps.

Step 700: Start.

Step 702: Configure the compressor 117 to employ a compression algorithm.

Step 704: Set the indication information INFO in response to the compression algorithm employed by the compressor 117.

Step 706: Set the channel ID number $ID_{CH}$ indicative of which driver IC should be connected for data transmission.

Step 708: Record the channel ID number $ID_{CH}$ and the indication information INFO in an output bitstream. For example, the indication information INFO is recorded by setting a command set in a payload portion of the output bitstream, and the channel ID number $ID_{CH}$ is recorded by setting a header portion of the output bitstream.

Step 710: Transmit the output bitstream over the display interface 103.

Step 712: Get the channel ID number $ID_{CH}$ from an input bitstream. For example, the channel ID number $ID_{CH}$ is obtained by parsing a header portion of the input bitstream.

Step 714: Dispatch the input bitstream to a selected driver IC with the channel ID number $ID_{CH}$.

Step 716: Receive the input bitstream dispatched from the channel controller 504.

Step 718: Parse the indication information INFO included in the input bitstream. For example, the indication information INFO is obtained by parsing a command set in a payload portion of the input bitstream.

Step 720: Configure the de-compressor 127 to employ a de-compression algorithm as indicated by the indication information INFO.

Step 722: End.

It should be noted that steps 702-710 are performed by the application processor (AP) 102, step 712 is performed by the channel detector 502, step 714 is performed by the channel controller 504, and steps 716-720 are performed by the selected driver IC (i.e., one of the driver ICs 106, 506, 508, 510). As a person skilled in the art can readily understand details of each step shown in FIG. 7 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing apparatus comprising:
   a compressor, arranged for generating a compressed display data by compressing a display data according to a compression algorithm; and
   an output interface, arranged for recording indication information in an output bitstream and outputting the output bitstream to another data processing apparatus via a display interface, wherein the output bitstream is derived from the compressed display data, and the indication information is set in response to the compression algorithm employed by the compressor;
   wherein the display interface is not a network interface, and is coupled between the data processing apparatus and the another data processing apparatus that are located at different chips.

2. The data processing apparatus of claim 1, wherein the display interface is a display serial interface (DSI) standardized by a Mobile Industry Processor Interface (MIPI) or an embedded display port (eDP) standardized by a Video Electronics Standards Association (VESA).

3. The data processing apparatus of claim 1, wherein the output interface records the indication information by setting a command set in a payload portion of the output bitstream.

4. The data processing apparatus of claim 3, wherein a first end of the display interface is coupled to the output interface of the data processing apparatus, and a second end of the display interface is allowed to be coupled to any of a plurality of specific data processing apparatuses; the output interface further records a channel identification (ID) number in a header portion of the output bitstream to indicate which one of the specific data processing apparatuses is connected for receiving the output bitstream.

5. A data processing apparatus comprising:
- a de-compressor, arranged for de-compressing a compressed display data derived from an input bitstream; and
- an input interface, arranged for receiving the input bitstream from another data processing apparatus via a display interface, parsing indication information included in the input bitstream, and configuring the de-compressor to employ a de-compression algorithm as indicated by the indication information;
- wherein the display interface is not a network interface, and is coupled between the data processing apparatus and the another data processing apparatus that are located at different chips.

6. The data processing apparatus of claim 5, wherein the display interface is a display serial interface (DSI) standardized by a Mobile Industry Processor Interface (MIPI) or an embedded display port (eDP) standardized by a Video Electronics Standards Association (VESA).

7. The data processing apparatus of claim 5, wherein the input interface obtains the indication information by parsing a command set in a payload portion of the input bitstream.

8. The data processing apparatus of claim 7, wherein one end of the display interface is allowed to be coupled to any of a plurality of specific data processing apparatuses, including the data processing apparatus; and the data processing apparatuses is connected for receiving the input bitstream according to a channel identification (ID) number recorded in a header portion of the input bitstream.

9. A data processing method comprising:
- generating a compressed display data by compressing a display data according to a compression algorithm; and
- recording indication information in an output bitstream and outputting the output bitstream from a first data processing apparatus to a second data processing apparatus via a display interface, wherein the output bitstream is derived from the compressed display data, and the indication information is set in response to the compression algorithm;
- wherein the display interface is not a network interface, and is coupled between the first data processing apparatus and the second data processing apparatus that are located at different chips.

10. The data processing method of claim 9, wherein the display interface is a display serial interface (DSI) standardized by a Mobile Industry Processor Interface (MIPI) or an embedded display port (eDP) standardized by a Video Electronics Standards Association (VESA).

11. The data processing method of claim 9, wherein the step of recording the indication information in the output bitstream comprises:
- recording the indication information by setting a command set in a payload portion of the output bitstream.

12. The data processing method of claim 11, wherein a first end of the display interface is coupled to the output bitstream, and a second end of the display interface is allowed to be coupled to any of a plurality of specific data processing apparatuses; and the data processing method further comprises:
- recording a channel identification (ID) number in a header portion of the output bitstream to indicate which one of the specific data processing apparatuses is connected for receiving the output bitstream.

13. The data processing method of claim 9, wherein the indication information is adjusted when at least one of a compression ratio, a compression unit size, a color format, a sub-sampling format, and a bit depth of the compression algorithm is changed.

14. A data processing method comprising:
- de-compressing a compressed display data derived from an input bitstream; and
- receiving the input bitstream that is transmitted from a first data processing apparatus to a second data processing apparatus via a display interface, parsing indication information included in the input bitstream, and configuring the de-compressing step to employ a de-compression algorithm as indicated by the indication information;
- wherein the display interface is not a network interface, and is coupled between the first data processing apparatus and the second data processing apparatus that are located at different chips.

15. The data processing method of claim 14, wherein the display interface is a display serial interface (DSI) standardized by a Mobile Industry Processor Interface (MIPI) or an embedded display port (eDP) standardized by a Video Electronics Standards Association (VESA).

16. The data processing method of claim 14, wherein the step of parsing the indication information included in the input bitstream comprises:
- obtaining the indication information by parsing a command set in a payload portion of the input bitstream.

17. The data processing method of claim 16, wherein one end of the display interface is allowed to be coupled to any of a plurality of specific data processing apparatuses; and the data processing method further comprises:
- receiving the input bitstream from the display interface according to a channel identification (ID) number recorded in a header portion of the input bitstream.

18. The data processing method of claim 14, wherein the indication information is adjusted when at least one of a compression ratio, a compression unit size, a color format, a sub-sampling format, and a bit depth of the compression algorithm is changed.

* * * * *